US011935498B2

(12) United States Patent
Chen et al.

(10) Patent No.: US 11,935,498 B2
(45) Date of Patent: Mar. 19, 2024

(54) DISPLAY APPARATUS WITH SIGNAL REPAIR CIRCUIT, DRIVE CHIP THEREFOR, AND RELATED ELECTRONIC DEVICE

(71) Applicant: Honor Device Co., Ltd., Shenzhen (CN)

(72) Inventors: Pengming Chen, Shenzhen (CN); Jide Liang, Shenzhen (CN); Ruiliang Li, Shenzhen (CN); Feng Zhang, Shenzhen (CN); Jiandong Deng, Shenzhen (CN); Muyao Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/759,595

(22) PCT Filed: Sep. 22, 2021

(86) PCT No.: PCT/CN2021/119652
§ 371 (c)(1),
(2) Date: Jul. 27, 2022

(87) PCT Pub. No.: WO2022/068653
PCT Pub. Date: Apr. 7, 2022

(65) Prior Publication Data
US 2023/0064759 A1 Mar. 2, 2023

(30) Foreign Application Priority Data
Sep. 30, 2020 (CN) ........................ 202011066272.3

(51) Int. Cl.
*G09G 3/36* (2006.01)
*G09G 3/00* (2006.01)
*G09G 3/3225* (2016.01)

(52) U.S. Cl.
CPC ........... *G09G 3/3648* (2013.01); *G09G 3/006* (2013.01); *G09G 3/3225* (2013.01); *G09G 2330/08* (2013.01); *G09G 2330/12* (2013.01)

(58) Field of Classification Search
CPC .... G09G 3/3648; G09G 3/006; G09G 3/3225; G09G 2330/08; G09G 2330/12
See application file for complete search history.

(56) References Cited

U.S. PATENT DOCUMENTS 6,111,558 A 8/2000 Jeung et al.
8,023,059 B2 9/2011 Chung et al.
(Continued)

FOREIGN PATENT DOCUMENTS

CN 101216643 A 7/2008
CN 101441336 A 5/2009
(Continued)

*Primary Examiner* — Kwang-Su Yang
(74) *Attorney, Agent, or Firm* — Slater Matsil, LLP

(57) ABSTRACT

Disclosed are a display apparatus, a drive chip, and an electronic device. When determining that a disconnected signal line exists, the drive chip sends a control signal to a signal line repair module, so that when a shift output end of the first shift unit corresponding to the disconnected signal line outputs an enable signal, a selector switch corresponding to the shift output end is turned on, and then a connection control unit keeps outputting a turn-on signal to a control end of a corresponding connection switch.

19 Claims, 8 Drawing Sheets

(56) References Cited

U.S. PATENT DOCUMENTS

| | | | | |
|---|---|---|---|---|
| 9,625,779 | B2 | 4/2017 | Wang et al. | |
| 10,002,917 | B2 | 6/2018 | Xu et al. | |
| 11,156,885 | B2 | 10/2021 | Chien | |
| 2006/0164587 | A1 | 7/2006 | Oh | |
| 2012/0119829 | A1* | 5/2012 | Lee | G09G 3/20 330/124 R |
| 2014/0104251 | A1* | 4/2014 | Zhang | G09G 3/3611 438/30 |
| 2014/0240304 | A1 | 8/2014 | In et al. | |
| 2015/0212379 | A1* | 7/2015 | Wang | G02F 1/13452 438/4 |
| 2016/0140935 | A1 | 5/2016 | Hwang et al. | |
| 2016/0189644 | A1* | 6/2016 | So | G09G 3/3233 345/103 |

FOREIGN PATENT DOCUMENTS

| | | | |
|---|---|---|---|
| CN | 102043292 | A | 5/2011 |
| CN | 102455960 | A | 5/2012 |
| CN | 102879964 | A | 1/2013 |
| CN | 103235459 | A | 8/2013 |
| CN | 105575305 | A | 5/2016 |
| CN | 105652482 | A | 6/2016 |
| CN | 106445249 | A | 2/2017 |
| CN | 107340659 | A | 11/2017 |
| CN | 108761853 | A | 11/2018 |
| CN | 110262609 | A | 9/2019 |
| CN | 110376809 | A | 10/2019 |
| CN | 110806667 | A | 2/2020 |
| CN | 114255680 | A | 3/2022 |
| KR | 20060085749 | A | 7/2006 |

* cited by examiner

DISPLAY APPARATUS WITH SIGNAL REPAIR CIRCUIT, DRIVE CHIP THEREFOR, AND RELATED ELECTRONIC DEVICE

CROSS-REFERENCE TO RELATED APPLICATIONS

This application is a National Stage of International Application No. PCT/CN2021/119652, filed Sep. 22, 2021, which claims priority to Chinese Patent Application No. 202011066272.3, filed Sep. 30, 2020, both of which are hereby incorporated by reference in their entireties.

TECHNICAL FIELD

This application relates to the field of display technologies, and in particular, to a display apparatus, a drive chip, and an electronic device.

BACKGROUND

With development of display technologies, mobile phones, computers, televisions, and smart wearable devices with display functions are becoming increasingly important in people's work and life, and users have higher requirements for quality of these display products. In both a liquid crystal display technology and an organic self-luminous display technology, various signal lines need to be disposed in a display panel to implement display. However, due to a process of the signal lines or other reasons, there is a risk of disconnection of the signal lines, and consequently, black lines or white lines appear during display, which affects a display effect, or even affects accuracy of displayed information.

Currently, a method for repairing a disconnected signal line of a display is to physically connect the disconnected signal line to a reserved signal line through laser sintering, and electrically connect the reserved signal line to an output end of a drive chip to wind from a non-display area of the display to an end of the signal line away from the drive chip. A signal transmitted by the reserved signal line is the same as a signal that should be transmitted by the disconnected signal line, thereby ensuring that the display can display normally.

However, the existing method for repairing a disconnected line requires a manual operation after the display is returned to a factory. This process is cumbersome, costly, and inefficient.

SUMMARY

This application provides a display apparatus, a drive chip, and an electronic device, so as to resolve the foregoing problems.

According to a first aspect, an embodiment of this application provides a display apparatus, including a plurality of sub-pixels for light-emitting display, a plurality of first signal lines that are electrically connected to the sub-pixels and provide a signal required for light emitting to the sub-pixels, a signal line repair module electrically connected to the plurality of first signal lines and configured to repair a disconnected first signal line, and a drive chip electrically connected to the plurality of first signal lines and the signal line repair module and providing the signal required for controlling the light-emitting display of the sub-pixels to the first signal lines; the signal line repair module includes a repair line, a connection switch group, a connection control unit group, a selector switch group, and a first shift unit group; the switch group includes a plurality of connection switches disposed in a one-to-one correspondence with a plurality of first signal lines, an input end of each connection switch is electrically connected to the corresponding first signal line, and an output end thereof is electrically connected to the repair line; the connection control unit group includes a plurality of connection control units disposed in a one-to-one correspondence with the connection switches, an output end of each connection control unit is connected to a control end of the corresponding connection switch, and when the output end of the connection control unit outputs a turn-on signal to the control end of the connection switch, the first signal line electrically connected to the input end of the connection switch is electrically connected to the repair line electrically connected to the output end of the connection switch; the selector switch group includes a plurality of selector switches disposed in a one-to-one correspondence with the connection control units, and an output end of each selector switch is electrically connected to a connection control end of the corresponding connection control unit; the first shift unit group includes a plurality of stages of first shift units disposed in a one-to-one correspondence with the plurality of selector switches, and a shift output end of each first shift unit is electrically connected to an input end of the corresponding selector switch; the drive chip is configured to: when determining that a disconnected first signal line exists, send a control signal to the signal line repair module, to enable the disconnected first signal line to be electrically connected to the repair line in the signal line repair module; and sending a control signal to the signal line repair module, to enable the disconnected first signal line to be electrically connected to the repair line in the signal line repair module includes: sending a control signal to the signal line repair module, so that the shift output end of the first shift unit corresponding to the disconnected first signal line outputs an enable signal, to control the corresponding selector switch to be turned on; after the enable signal output by the shift output end reaches a corresponding connection control unit by using the selector switch turned on, controlling the connection control unit to keep outputting a turn-on signal, and transmitting the turn-on signal to a control end of a corresponding connection switch to turn on the corresponding connection switch, so that the disconnected first signal line is electrically connected to the repair line.

According to a second aspect, an embodiment of this application provides a drive chip, which is configured to: provide a signal for controlling sub-pixels to perform light-emitting display, and provide a control signal to enable a disconnected first signal line to be electrically connected to a repair line in a signal line repair module; and specifically, sending a control signal to the signal line repair module, to enable the disconnected first signal line to be electrically connected to the repair line in the signal line repair module includes: sending a control signal to the signal line repair module, so that a shift output end of the first shift unit corresponding to the disconnected first signal line outputs an enable signal, to control a corresponding selector switch to be turned on; after the enable signal output by the shift output end reaches a corresponding connection control unit by using the selector switch turned on, controlling the connection control unit to keep outputting a turn-on signal, and transmitting the turn-on signal to a control end of a corresponding connection switch to turn on the corresponding connection switch, so that the disconnected first signal line is electrically connected to the repair line.

According to a third aspect, an embodiment of this application further provides an electronic device, including the display apparatus according to the first aspect.

In the display apparatus, the drive chip, and the electronic device according to embodiments of this application, the signal line repair module may repair a disconnected first signal line, that is, the display apparatus may repair the disconnected first signal line without being returned to a factory, which is easy to implement, has high repair efficiency, and require low costs; and a structure for controlling connection of connection switches is first shift units that may sequentially output enable signals, so that manual laser sintering is not required, and accuracy is high.

DETAILED DESCRIPTION OF ILLUSTRATIVE EMBODIMENTS

Terms used in implementations of this application are only used to explain specific embodiments of this application, and are not intended to limit this application.

Figure 1:
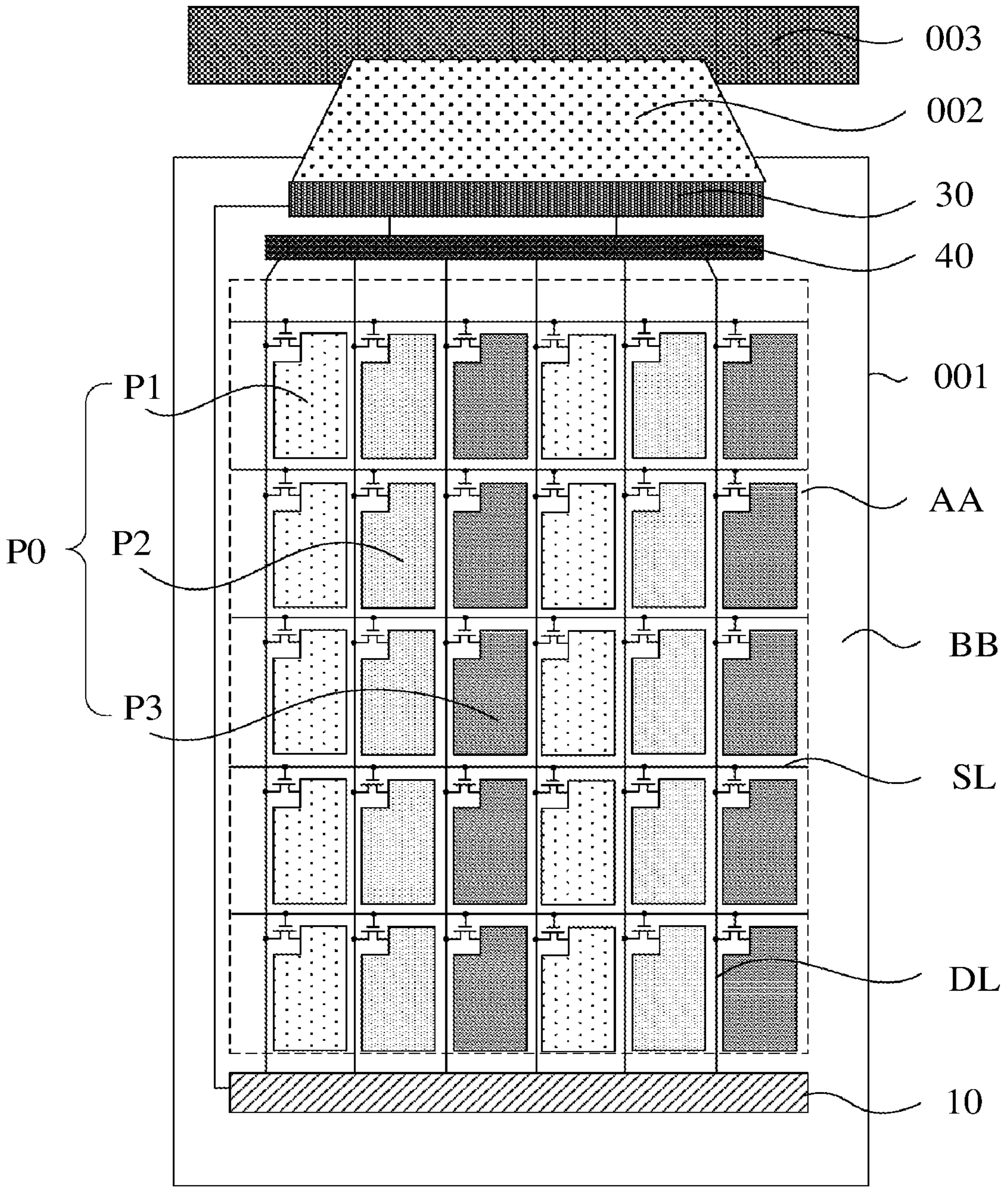
FIG. 1 is a schematic diagram of a display apparatus according to an embodiment of this application.
Figure 2:
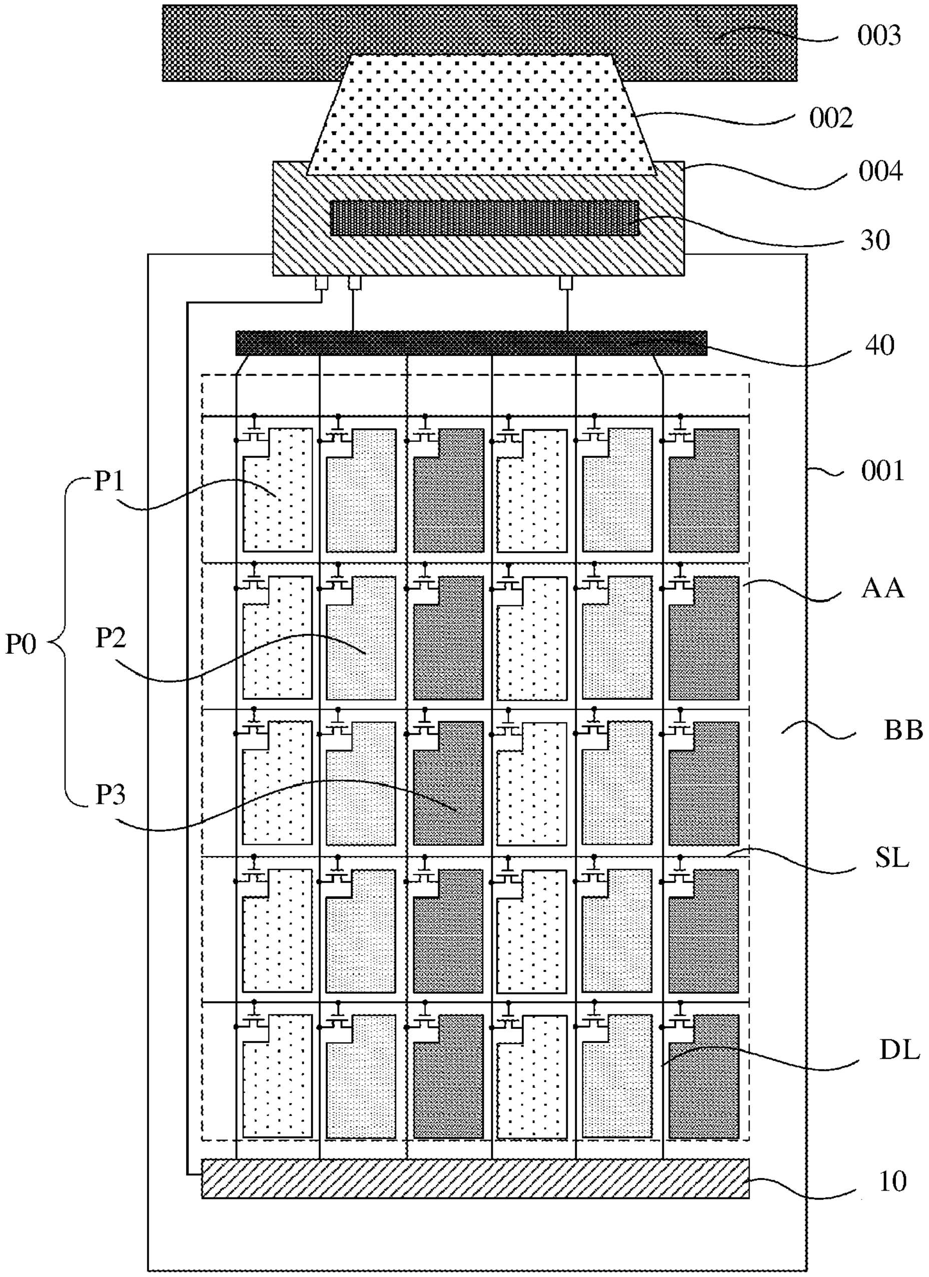
FIG. 2 is a schematic diagram of another display apparatus according to an embodiment of this application.

FIG. 1 is a schematic diagram of a display apparatus according to an embodiment of this application, and FIG. 2 is a schematic diagram of another display apparatus according to an embodiment of this application.

As shown in FIG. 1 and FIG. 2, the display apparatus according to this embodiment of this application includes a display panel 001, and the display panel 001 includes a display area AA and a non-display area BB surrounding the display area AA. A plurality of signal lines are disposed in the display area AA. The plurality of signal lines include first signal lines DL and second signal lines SL, extension directions of the first signal lines DL and the second signal lines SL cross each other, and the first signal lines DL and the second signal lines SL cross to define a plurality of sub-pixels P0. The sub-pixels are used for light-emitting display, the first signal lines DL and the second signal lines SL are electrically connected to the corresponding sub-pixels P0, and the sub-pixels P0 provide a signal required for light-emitting display. The plurality of sub-pixels P0 include first color sub-pixels P1, second color sub-pixels P2, and third color sub-pixels P3. The non-display area BB includes a signal line repair module 10, and the signal line repair module 10 may repair a disconnected first signal line DL in a signal line repair stage and a display stage of the display apparatus.

It should be noted that the signal line repair module 10 is electrically connected to a plurality of first signal lines DL, and may repair the disconnected first signal line DL, and the first signal line DL may be either a data line or a scanning line. The signal line repair module 10 is electrically connected to a plurality of second signal lines SL, and may repair a disconnected second signal line SL. The first signal lines DL may be data lines that extend in a column direction and are arranged in a row direction, and the first signal lines DL may provide a data signal required for light-emitting display to the sub-pixels P0. The second signal lines SL may be scanning lines that extend in the row direction and are arranged in the column direction, and the second signal lines SL may provide a scanning signal required for light-emitting display to the sub-pixels P0. Alternatively, the first signal lines DL may be scanning lines that extend in the row direction and are arranged in the column direction, and the first signal lines DL may provide a scanning signal required for light-emitting display to the sub-pixels P0. The second signal lines SL may be data lines extending in the column direction and arranged in the row direction, and the second signal lines SL may provide a data signal required for light-emitting display to the sub-pixels P0. In this embodiment of this application, the inventive concept of this application is explained by using the signal line repair module 10 for repairing the first signal lines DL as an example, but it may be understood that the signal line repair module 10 in this embodiment of this application may also be configured to repair the second signal lines SL in the display panel 001.

In an embodiment, the display apparatus may be a liquid crystal display apparatus, and the display panel 001 includes an array substrate, a color film substrate, and a liquid crystal molecular layer located between the array substrate and the color film substrate. The array substrate includes a plurality of pixel circuits located in the display area AA, the color film substrate includes a color resist layer and a black matrix, and the color resist layer includes at least color resists of different colors. Optionally, the display panel 001 further includes a touch module located on a side of the color film substrate away from the array substrate. In this embodiment of this application, the signal line repair module 10 is added to the display panel 001, where the signal line repair module 10 is located in the non-display area BB, and the signal line repair module 10 is disposed on the array substrate.

In another embodiment, the display apparatus may alternatively be an organic light emitting display apparatus, and the display panel 001 includes an array substrate, a light-emitting device layer, and a packaging structure that are sequentially arranged. Optionally, the display panel 001 further includes a touch module located on a side of the packaging structure away from the array substrate. The light-emitting device layer includes a plurality of light-emitting devices, and the light-emitting devices each include an anode, a light-emitting layer, and a cathode that are stacked. The packaging structure is configured to package and protect the light-emitting devices to ensure service lives of the light-emitting devices. In this embodiment of this application, the signal line repair module 10 is added to the display panel 001, where the signal line repair module 10 is located in the non-display area BB, and the signal line repair module 10 is disposed on the array substrate.

In another embodiment, the display apparatus may alternatively be any display apparatus in an existing technology, such as a micro LED (Light Emitting Diode, light emitting diode) display apparatus or an electrophoretic display apparatus.

The display apparatus according to this embodiment of this application further includes a drive chip 30, and the drive chip 30 is configured to provide a signal required for controlling light-emitting display of the sub-pixels P0 to the first signal lines DL and the second signal lines SL. The drive chip may use a line disconnection detection circuit to implement automatic detection of a disconnected signal line. For details, refer to patent application No. CN202011014217.X filed on Sep. 24, 2020 and entitled "METHOD FOR DETECTING DEFECT OF DISPLAY LINE". Certainly, the display apparatus may also detect whether a signal line is subjected to a disconnection fault by using another method. Details are not described herein again.

In an embodiment of this application, as shown in FIG. 1 and FIG. 2, the signal line repair module 10 is disposed at an end of each first signal line DL in an extension direction, so as to facilitate electrical connection to the first signal line DL. In an implementation, as shown in FIG. 1, a drive chip 30 is disposed at one end of each first signal line DL, the drive chip 30 is electrically connected to a mainboard 003 by using a flexible circuit board 002, and a signal line repair module 10 is disposed at the other end of the first signal line DL. In another implementation, as shown in FIG. 2, a chip on film 004 is bound to one end of each first signal line DL, a drive chip 30 is disposed on a flexible circuit board of the chip on film 004, the chip on film 004 is electrically connected to a mainboard 003 by using a flexible circuit board 002, and a signal line repair module 10 is disposed at the other end of the first signal line DL. In addition, the drive chip 30 may provide a signal to the first signal lines DL by using a multiplex selection circuit 40, that is, one port of the drive chip 30 corresponds to one input port of the multiplex selection circuit 40, and one input port of the multiplex selection circuit 40 corresponds to a plurality of output ports in a one-to-one correspondence with the first signal lines DL.

The signal line repair module 10 and the drive chip 30/multiplex selection circuit 40 are disposed at two opposite ends of each first signal line DL, and the signal line repair module 10 may repair a disconnected first signal line DL without preventing the drive chip 30 from providing a signal to the first signal lines DL.

Figure 3:
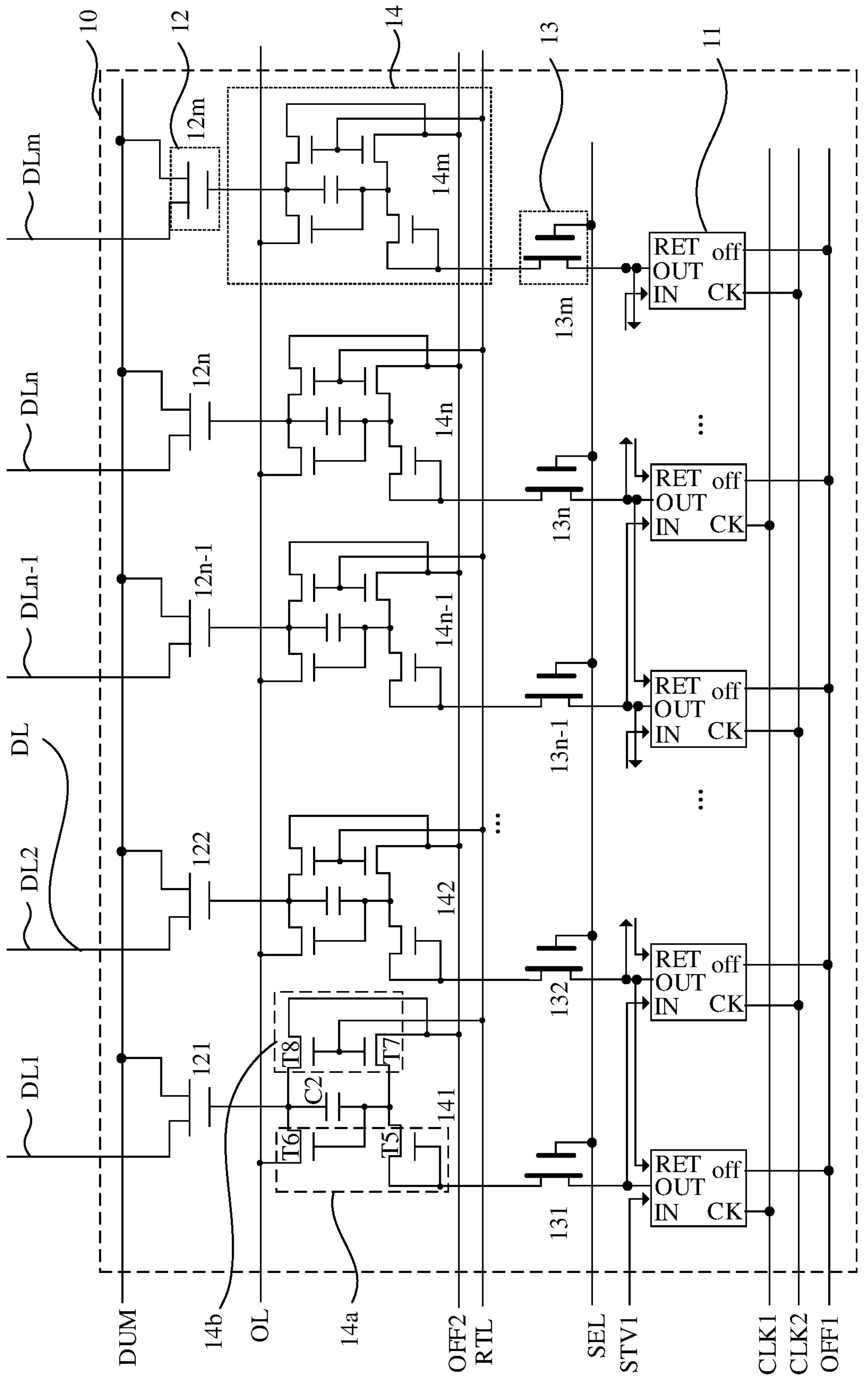
FIG. 3 is a partial enlarged view of a display apparatus according to an embodiment of this application.

FIG. 3 is a partial enlarged view of a display apparatus according to an embodiment of this application. As shown in FIG. 3, the signal line repair module 10 according to this embodiment of this application includes a first shift unit group, a selector switch group, a connection control unit group, a connection switch group, and a repair line DUM. The connection switch group includes a plurality of connection switches 12, and the plurality of connection switches 12 are disposed in a one-to-one correspondence with a plurality of first signal lines DL. The connection control unit group includes a plurality of connection control units 14, and the connection control units 14 are disposed in a one-to-one correspondence with the connection switches 12. The selector switch group includes a plurality of selector switches 13, and the selector switches 13 are disposed in a one-to-one correspondence with the connection control units 14. The first shift unit group includes a plurality of stages of first shift units 11, the plurality of stages of first shift units 11 are disposed in a one-to-one correspondence with the plurality of selector switches 13, and a shift output end OUT of each first shift unit 11 is electrically connected to an input end of a corresponding selector switch 13. An output end of each selector switch 13 is electrically connected to a connection control end of a corresponding connection control unit 14, and an output end of each connection control unit 14 is electrically connected to a control end of a corresponding connection switch 12.

When the selector switch 13 is turned on, an enable signal output by the first shift unit 11 is transmitted to the connection control end of the connection control unit 14 by using the selector switch 13 turned on, to control the connection control unit 14 to output a turn-on signal.

An input end of each connection switch 12 is electrically connected to a corresponding first signal lines DL, and output ends of the plurality of connection switches 12 in the same connection switch group are electrically connected to one corresponding repair line DUM. When one connection switch 12 is turned on, the first signal line DL electrically connected to the connection switch 12 is electrically connected to the repair line DUM, so as to implement repair of the first signal line DL. When the connection switch 12 is turned off, the first signal line DL electrically connected to the connection switch 12 turned off is electrically disconnected from the repair line DUM. Then, when at least one first signal line DL is disconnected, by turning on the connection switch 12 electrically connected to the disconnected first signal line DL, the disconnected first signal line DL may be electrically connected to one repair line DUM, thereby repairing the disconnected first signal line DL. In an implementation of this application, the connection switch 12 may be a transistor, a source of the transistor is used as an input end thereof, a drain thereof is used as an output end thereof, and a gate thereof is used as a control end thereof.

The output end of the connection control unit 14 is connected to the control end of the corresponding connection switch 12 to control the connection switch 12 to be turned on or turned off, that is, the connection control unit 14 controls the connection switch 12 to be turned on or turned off. When the output end of the connection control unit 14 outputs a turn-on signal to the control end of the connection switch 12, the first signal line DL electrically connected to the input end of the connection switch 12 is electrically connected to the repair line DUM electrically connected to the output end of the connection switch 12.

The output end of the selector switch 13 in the selector switch group is electrically connected to the connection control end of the corresponding connection control unit 14, the input end thereof is electrically connected to the shift output end OUT of the corresponding first shift unit 11, and the control end thereof is electrically connected to a selection signal line SEL. The selection signal line SEL is electrically connected to the drive chip 30. When a selection signal transmitted by the drive chip 30 is transmitted on the selection signal line SEL, the selector switch 13 is turned on, and the connection control end of the connection control unit 14 is electrically connected to the shift output end OUT of the corresponding first shift unit 11, so that an enable signal output by a shift output end OUT of one first shift unit 11 may control the connection control unit 14 to output a turn-on signal for controlling the connection switch 12 to be turned on. In an implementation of this application, the selector switch 13 may be a transistor, a source of the transistor is used as an input end thereof, a drain thereof is used as an output end thereof, and a gate thereof is used as a control end thereof.

The plurality of stages of first shift units 11 in the first shift unit group may sequentially output enable signals. In this embodiment of this application, the shift output ends OUT of the first shift units 11 of the signal repair module 10 sequentially output enable signals.

The drive chip 30 is electrically connected to a plurality of first signal lines DL and the signal line repair module 10, and is configured to provide a signal required for controlling light-emitting display of the sub-pixels to the first signal lines DL.

When determining that a first signal line DL is disconnected, the drive chip 30 sends a control signal to the signal line repair module 10, so that the disconnected first signal line DL is electrically connected to a repair line DUM of the signal line repair module 10. Specifically, the first shift unit 11 of the drive chip 30 outputs a signal, so that shift output ends OUT of a plurality of stages of first shift units 11 sequentially output enable signals, and when the shift output end OUT of the first shift unit 11 corresponding to the disconnected first signal line DL outputs an enable signal, the drive chip 30 transmits a selection signal to the selection signal line SEL to control the selector switch 13 to be turned on, then the enable signal output by the shift output end OUT of the first shift unit 11 corresponding to the disconnected first signal line DL reaches the corresponding connection control unit by using the selector switch 13 turned on, and then the connection control unit is controlled to keep outputting a turn-on signal to the control end of the connection switch 12. In the signal line repair stage and the subsequent display stage, the connection switch 12 corresponding to the disconnected first signal line DL is still turned on under control by the turn-on signal, so that the disconnected first signal line DL is kept electrically connected to the repair line DUM, and the repair line DUM may provide a data signal to the disconnected and repaired first signal line DL.

Assuming that a plurality of first signal lines DL are disconnected, shift output ends OUT of a plurality of stages of first shift units 11 sequentially output enable signals. When the first shift unit 11 of one stage corresponding to a disconnected first signal line DL outputs an enable signal, a selector switch 13 is controlled to be turned on, and then the enable signal output by the first shift unit 11 of this stage is transmitted to a corresponding connection control unit 14 and controls the corresponding connection control unit 14 to output a turn-on signal for turning on a corresponding connection switch 12, thereby controlling the connection switch 12 to be turned on and completing repair of the disconnected first signal line DL. After repair of one first signal line DL is completed based on the foregoing method for repairing a first signal line DL, the selector switch 13 is turned off, and the connection switch 12 that is turned on is still turned on due to the existence of the connection control unit 14; then, by using the foregoing method, when the shift output end OUT of the first shift unit 11 corresponding to another disconnected first signal line DL outputs an enable signal, the selector switch 13 is turned on, so that repair of another first signal line DL may be implemented. Then, the signal line repair module 10 in this embodiment of this application may electrically connect a plurality of disconnected first signal lines DL to the same repair line DUM, thereby implementing repair of the plurality of disconnected first signal lines DL.

In addition, in this embodiment of this application, first signal lines DL electrically connected to the repair line DUM may alternatively be changed as required. For example, when a relatively small quantity of first signal lines DL are disconnected, the first signal lines DL may all be electrically connected to the same repair line DUM. When the quantity of disconnected first signal lines DL increases, disconnected first signal lines DL near an edge position may be electrically insulated from the repair line DUM, while the disconnected first signal lines DL near a central position are electrically connected to the repair line DUM. Based on different colors of sub-pixels of signals provided by disconnected first signal lines DL, first signal lines DL corresponding to sub-pixels with more color loss due to line disconnection may alternatively be connected to the repair line DUM or disconnected first signal lines DL corresponding to sub-pixels of a same color may be electrically connected to the same repair line DUM.

If a position at which a first signal line DL is disconnected is in the display area AA, in the display stage, a line segment of the disconnected first signal line DL that is electrically connected to the signal line repair module 10 may also receive a display signal, and the display signal is transmitted by a repair line DUM repairing the first signal line DL and may be the same as the original display signal of the first signal line DL. A line segment of the disconnected first signal line DL that is not electrically connected to the signal line repair module 10 may normally receive the display signal. If a position at which a first signal line DL is disconnected is in the non-display area BB, in the display stage, the disconnected first signal line DL may receive a display signal, and the display signal is transmitted by a repair line DUM repairing the first signal line DL and may be the same as the original display signal of the first signal line DL.

The display apparatus according to this embodiment of this application includes a signal line repair module 10, and the signal line repair module 10 may repair a disconnected first signal line DL, that is, the display apparatus may repair the disconnected first signal line DL without being returned to a factory, which is easy to implement, has high repair efficiency, and requires low costs. In this embodiment of this application, a structure for controlling connection of the connection switches 12 is the first shift units 11 that output enable signals, so that manual laser sintering is not required, and accuracy is high.

Figure 4:
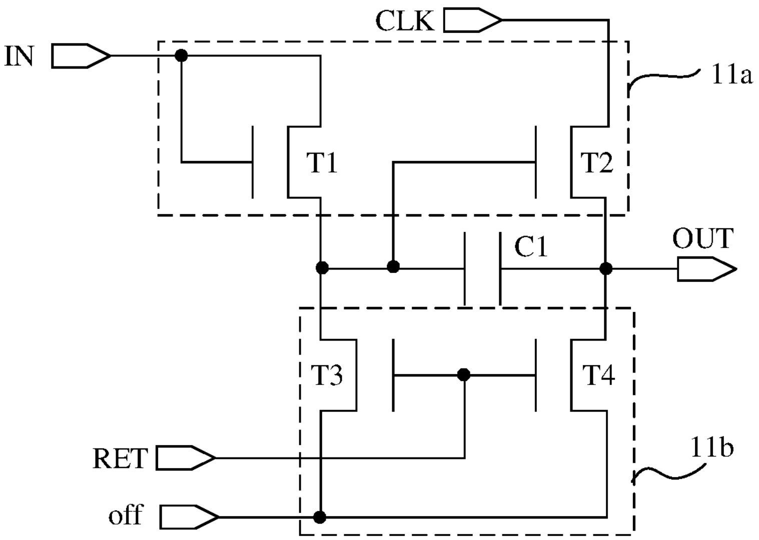
FIG. 4 is a schematic diagram of an equivalent circuit diagram of a shift unit according to an embodiment of this application.
Figure 5:
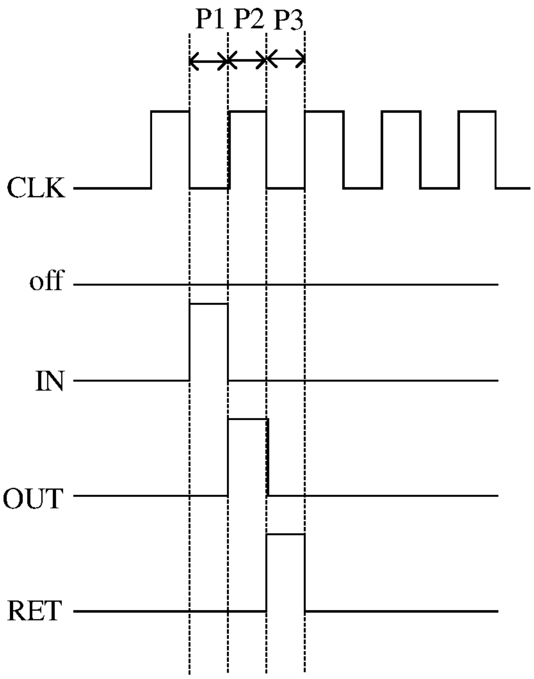
FIG. 5 is a sequence diagram of a shift unit according to the embodiment shown in FIG. 4.

FIG. 4 is a schematic diagram of an equivalent circuit diagram of a shift unit according to an embodiment of this application, and FIG. 5 is a sequence diagram of a shift unit according to the embodiment shown in FIG. 4. The structure and operation process of the first shift unit 11 in this embodiment of this application are illustrated below with reference to FIG. 4 and FIG. 5 as an example.

As shown in FIG. 4, a first shift unit 11 includes a first output subunit 11*a* and a first reset subunit 11*b*, where the first output subunit 11*a* includes a turn-on signal input end IN and a clock signal input end CLK; and the first reset subunit 11*b* includes a reset control signal input end RET and a reset signal input end off. The first output subunit 11*a* is configured to control, under control of a signal of the turn-on signal input end IN and a signal of the clock signal input end CLK, a shift output end OUT of the first shift unit 11 to output an enable signal that enables a connection control unit 14 to output a turn-on signal. The reset subunit 11*b* is configured to control, under control of a signal of the reset control signal input end RET and a signal of the reset signal input end off, the shift output end OUT of the first shift unit 11 to output a reset signal, and the reset signal enables the connection control unit 14 to stop outputting the turn-on signal.

The turn-on signal input end IN, the clock signal input end CLK, the reset control signal input end RET, and the reset signal input end off are all electrically connected to the drive chip 30, and obtain, from the drive chip 30, a signal for driving the first shift unit 11 to operate.

As shown in FIG. 4, the first output subunit 11*a* further includes a first transistor T1, a second transistor T2, and a first capacitor C1. A gate and a source of the first transistor T1 are both connected to the turn-on signal input end IN, and a drain thereof is electrically connected to a first polar plate of the first capacitor C1; a gate of the second transistor T2 is electrically connected to the first polar plate of the first capacitor C1, a source thereof is electrically connected to the clock signal input end CLK, and a drain thereof is electrically connected to the shift output end OUT. A second polar plate of the first capacitor C1 is electrically connected to the shift output end OUT. As shown in FIG. 4, the first reset subunit 11*b* includes a third transistor T3 and a fourth transistor T4. A gate of the third transistor T3 is electrically connected to the reset control signal input end RET, a source thereof is electrically connected to the reset signal input end off, and a drain thereof is electrically connected to the first polar plate of the capacitor; a gate of the fourth transistor T4 is electrically connected to the reset control signal input end RET, a source thereof is electrically connected to the reset signal input end off, and a drain thereof is electrically connected to the shift output end out.

It should be noted that FIG. 4, FIG. 5, and the following descriptions are based on an example in which T1 to T4 are N-type transistors. In fact, T1 to T4 may alternatively be P-type transistors. FIG. 5 shows three operating stages of the first shift unit 11.

In the first stage P1, when the turn-on signal input end IN receives an active signal, that is, a high-level signal, the first transistor T1 is turned on, and the active signal received by the turn-on signal input end IN is transmitted to the first polar plate of the first capacitor C1 by using the first transistor T1 that is turned on. Because the gate of the second transistor T2 is electrically connected to the first polar plate of the first capacitor C1, the second transistor T2 is turned on and remains in an on state. In this case, if a pulse signal received by the clock signal input end CLK is a low-level signal or an inactive-level signal, the shift output end OUT outputs a low-level signal or an inactive-level signal.

In the second stage P2, due to the action of the first capacitor C1, the second transistor T2 is continuously turned on, the pulse signal received by the clock signal input end CLK is an active signal, and the shift output end OUT outputs an enable signal.

In the third stage P3, when the reset control signal input end RET receives an active signal, that is, a high-level signal, the third transistor T3 and the fourth transistor T4 are turned on. The third transistor T3 provides a reset signal received by the reset signal input end off to the first polar plate of the first capacitor C1 and the gate of the second transistor T2, and the second transistor T2 is turned off. The fourth transistor T4 provides the reset signal received by the reset signal input end off to the shift output end OUT, to reset the shift output end OUT.

In an embodiment of this application, a plurality of stages of first shift units 11 included in a first shift unit group in the signal repair module 10 are sequentially cascaded.

As shown in FIG. 3, the shift output end OUT of the first shift unit 11 of the previous stage in two adjacent stages of first shift units 11 among the cascaded first shift units 11 included in the signal repair module 10 is electrically connected to the turn-on signal input end IN of the first shift unit 11 of the next stage, and the shift output end OUT of the first shift unit 11 of the next stage is electrically connected to the reset control signal input end RET of the first shift unit 11 of the previous stage. That is, the shift output end OUT of the first shift unit 11 of the previous stage may not only output an enable signal to control a connection switch 12 electrically connected thereto to be turned on, but also provide an enable signal to the turn-on signal input end IN of the first shift unit 11 of the next stage to control the first shift unit 11 of the next stage to start operating; and the shift output end OUT of the first shift unit 11 of the next stage may not only output an enable signal to control a connection switch 12 electrically connected thereto to be turned on, but also may provide an enable signal to the reset control signal input end RET of the first shift unit 11 of the previous stage to control the first shift unit 11 of the previous stage to stop operating. It should be noted that a turn-on signal input end IN of a first-stage shift unit among the cascaded first shift units 11 is electrically connected to a start signal line, for example, a first start signal line STV1, and the start signal line may provide an enable signal to the turn-on signal input end IN of the first-stage shift unit 11.

As shown in FIG. 3, clock signal input ends CLK of two adjacent stages of first shift units 11 among the cascaded first shift units 11 included in the signal repair module 10 are connected to different clock signal lines. As shown in FIG. 3, clock signal input ends CLK of a plurality of stages of first shift units 11 in the signal repair module 10 are alternately electrically connected to the first clock signal line CLK1 and the second clock signal line CLK2, and the first clock signal line CLK1 and the second clock signal line CLK2 output pulse signals alternately, so that the first shift units 11 cascaded in the signal repair module 10 may sequentially output enable signals in cooperation with a signal received by the turn-on signal input end IN.

As shown in FIG. 3, reset signal input ends off of the first shift units 11 included in the signal line repair module 10 may be all electrically connected to a same reset signal line, and the reset signal line may continuously transmit reset signals in a signal line repair stage. For example, the reset signal input ends off are electrically connected to a first reset signal line OFF1, and the first reset signal line OFF1 continuously outputs reset signals in the signal line repair stage.

As shown in FIG. 3, the connection control unit 14 includes a second output subunit 14*a* and a second reset subunit 14*b*. A control end of the second output subunit 14*a* is a connection control end of the connection control unit 14 and is electrically connected to an output end of a corresponding selector switch 13, an input end thereof is electrically connected to a turn-on signal line OL, and an output end thereof is used as an output end of the connection control unit 14 and is electrically connected to a control end of the corresponding connection switch 12. A control end of the second reset subunit 14*b* is used as a reset control end of the connection control unit 14 and is electrically connected to the reset control line RTL, an input end thereof is electrically connected to the second reset signal line OFF2, and an output end thereof is electrically connected to the control end of the corresponding connection switch 12 as an output end of the connection control unit 14.

The second output subunit 14*a* is configured to: when the enable signal output by the shift output end OUT of the corresponding first shift unit 11 is received and the drive chip 30 transmits a turn-on signal to the turn-on signal line, transmit the turn-on signal transmitted on the turn-on signal line OL to the control end of the corresponding connection switch 12, to control the connection switch 12 to be turned on. The second reset subunit 14*b* is configured to: when the drive chip 30 transmits a reset control signal to the reset control line RTL and transmits a reset signal to the second reset signal line OFF2, transmit the reset signal transmitted on the second reset signal line OFF2 to the control end of the corresponding connection switch 12, to control the connection switch 12 to be turned off, that is, to control the first signal line DL electrically connected to the input end of the connection switch 12 to be electrically disconnected from the repair line DUM electrically connected to the output end of the connection switch 12.

As shown in FIG. 3, the second output subunit 14*a* includes a fifth transistor T5 and a sixth transistor T6. In addition, the connection control unit 14 further includes a second capacitor C2. A gate of the fifth transistor T5 is electrically connected to a source thereof and is electrically connected to the output end of the selector switch 13 as the connection control end of the second output subunit 14*a*, and a drain thereof is electrically connected to a first polar plate of the second capacitor C2; a gate of the sixth transistor T6 is electrically connected to the first polar plate of the second capacitor C2, a source thereof is electrically connected to the turn-on signal line OL as the input end of the second output subunit 14*a*, and a drain thereof is electrically connected to a second polar plate of the second capacitor C2 as the output end of the second output subunit 14*a*. The second capacitor C2 is electrically connected to the control end of the connection switch 12 as the output end of the connection control unit 14. As shown in FIG. 3, the second reset subunit 14*b* includes a seventh transistor T7 and an eighth transistor T8. A gate of the seventh transistor T7 and a gate of the eighth transistor T8 as reset control ends of the second reset subunit 14*b* are electrically connected to the reset control line RTL, a source of the seventh transistor T7 and a source of the eighth transistor T8 as input ends of the second reset subunit 14*b* are electrically connected to the second reset signal line OFF2, a drain of the seventh transistor T7 is electrically connected to the first polar plate of the second capacitor C2, and a drain of the eighth transistor T8 is electrically connected to the control end of the connection switch 12.

It should be noted that FIG. 3 and the following descriptions are based on an example in which the fifth transistor T5 to the eighth transistor T8 are N-type transistors. In fact, the fifth transistor T5 to the eighth transistor T8 may alternatively be P-type transistors. It should be noted that, in this embodiment of this application, the circuit structure of the connection control unit 14 may be the same as the circuit structure of the first shift unit 11, and signals connected to signal ends of the connection control unit 14 and the first shift unit 11 may be different. The operation process of the connection control unit 14 in FIG. 3 is briefly described below.

When the gate and the source of the fifth transistor T5 receive an enable signal output by the shift output end OUT of the first shift unit 11 (that is, a high-level signal) as control ends of the second output subunit 14*a*, the fifth transistor T5 is turned on, and the connection control end of the second output subunit 14*a* receives the enable signal and transmits the enable signal to the first polar plate of the second capacitor C2 by using the fifth transistor T5 turned on. Because the gate of the sixth transistor T6 is electrically connected to the first polar plate of the second capacitor C2, the sixth transistor T6 is turned on and remains in an on state. In this case, a turn-on signal transmitted on the turn-on signal line OL is transmitted to a control end of a corresponding connection switch 12, and the connection switch 12 is turned on, to implement electrical connection between the first signal line DL and the repair line DUM.

Due to the action of the second capacitor C2, the sixth transistor T6 is continuously on, and the turn-on signal transmitted on the turn-on signal line OL is continuously transmitted to the control end of the corresponding connection switch 12, so that the first signal line DL is continuously electrically connected to the repair line DUM.

When the reset control line RTL receives the enable signal, that is, the high-level signal, the seventh transistor T7 and the eighth transistor T8 are turned on. The seventh transistor T7 provides, to the first polar plate of the second capacitor C2, the reset signal transmitted on the second reset signal line OFF2, and the sixth transistor T6 is turned off. The eighth transistor T8 provides, to the control end of the connection switch 12, the reset signal transmitted on the second reset signal line OFF2, the connection switch 12 is turned off, and then the corresponding first signal line DL is electrically disconnected from the repair line DUM.

Figure 6:
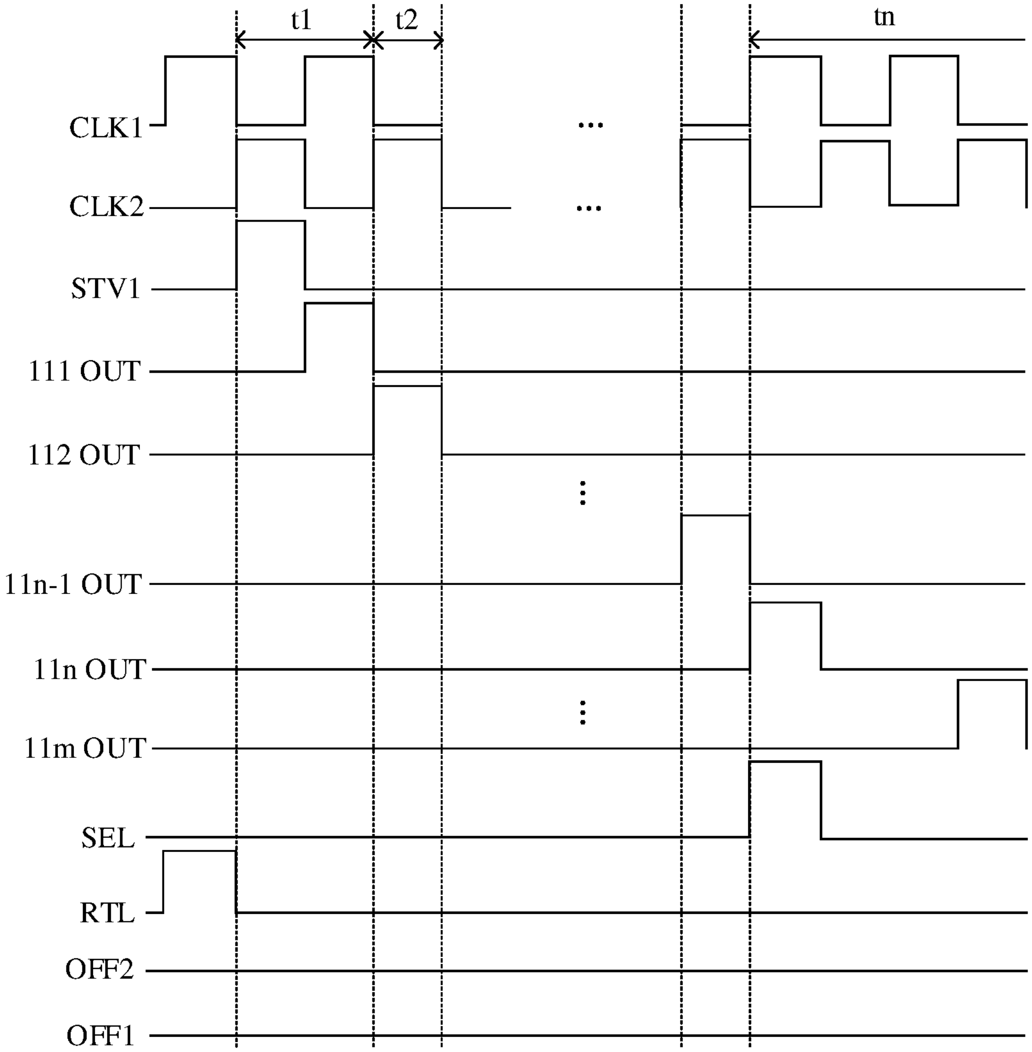
FIG. 6 is a sequence diagram of a signal line repair stage of the display apparatus shown in FIG. 3.

FIG. 6 is a sequence diagram of a signal line repair stage of the display apparatus shown in FIG. 3. The operation process of the signal line repair module 10 in this application is described below with reference to FIG. 3 and FIG. 6. As shown in FIG. 3, the signal line repair module 10 includes m stages of cascaded first shift units 11: a first-stage first shift unit 111, a second-stage first shift unit 112, . . . , a $(n-1)^{th}$-stage first shift unit 11($n$−1), an $n^{th}$-stage shift unit 11*n*, . . . an $m^{th}$-stage first shift unit nm, where m is a positive integer greater than or equal to 3. The connection switch group of the signal line repair module 10 includes m connection switches 12: a first connection switch 121, a second connection switch 122, . . . , a $(n-1)^{th}$ connection switch 12($n$−1), an $n^{th}$ connection switch 12*n*, . . . , and an $m^{th}$ connection switch 12*m*. The connection control unit group of the signal line repair module 10 includes m selector switches 13: a first selector switch 131, a second selector switch 132, . . . , a $(n-1)^{th}$ selector switch 13($n$−1), an $n^{th}$ selector switch 13*n*, . . . , and an $m^{th}$ selector switch 13*m*. The connection control unit group of the signal line repair module 10 includes m connection control units 14: a first connection control unit 141, a second connection control unit 142, . . . , a $(n-1)^{th}$ connection control unit 14($n$−1), an $n^{th}$ connection control unit 14*n*, . . . , and an $m^{th}$ connection control unit 14*m*. The display area AA of the display panel 001 may include m first signal lines DL: a first first signal line DL1, a second first signal line DL2, . . . , and a $(n-1)^{th}$ first signal line DL(n−1), an $n^{th}$ first signal line DLn, . . . , and an $m^{th}$ first signal line DLm. Input ends of the m connection switches 12 in the connection switch group are electrically connected to the m first signal lines DL in a one-to-one correspondence. Assuming that the $n^{th}$ first signal line DLn is disconnected, a specific operation process in which the signal line repair module 10 repairs the $n^{th}$ first signal line DLn is as follows:

At a time t1, the turn-on signal input end IN of the first-stage first shift unit 111 in the signal repair module 10 receives an enable signal transmitted by the first start signal line STV1, then the first clock signal line CLK1 connected to the clock signal input end CLK of the first-stage first shift unit 111 transmits an active signal, and then the shift output end OUT of the first-stage first shift unit 111 outputs an enable signal. Because no selection signal for turning on the first selector switch 131 is transmitted on the selection signal line SEL, the enable signal output by the shift output end OUT of the first-stage first shift unit 111 does not affect the first first signal line DIA.

At a time t2, the turn-on signal input end IN of the second-stage first shift unit 112 in the signal repair module 10 receives the enable signal output by the shift output end OUT of the first-stage first shift unit 111, then the second clock signal line CLK2 connected to the clock signal input end CLK of the second-stage first shift unit 112 transmits an active signal, and then the shift output end OUT of the second-stage first shift unit 112 outputs an enable signal. Similarly, because no selection signal for turning on the second selector switch 132 is transmitted on the selection signal line SEL, the enable signal output by the shift output end OUT of the second-stage first shift unit 112 does not affect the second first signal line DL2. In addition, the reset control signal input end RET of the first-stage first shift unit 111 receives the enable signal output by the shift output end OUT of the second-stage first shift unit 112, and then a reset signal transmitted by the first reset signal line OFF1 controls the first-stage first shift unit 111 to be turned off and the shift output end OUT of the first-stage first shift unit 111 is reset.

By analogy, at a time tn, the turn-on signal input end IN of the $n^{th}$-stage first shift unit 111 in the signal repair module 10 receives an enable signal output by the shift output end OUT of the $(n-1)^{th}$-stage first shift unit 111. Then, if the clock signal line connected to the clock signal input end CLK of the $n^{th}$-stage first shift unit 11*n*, for example, the first clock signal line CLK1, transmits an active signal, the shift output end OUT of the $n^{th}$-stage first shift unit 11*n* outputs an enable signal. In addition, a signal for turning on the $n^{th}$ selector switch 13*n* is transmitted on the selection signal line SEL, and then the enable signal output by the shift output end OUT of the $n^{th}$-stage first shift unit 11*n* is transmitted to the $n^{th}$ connection control unit 14*n*. In addition, a connection signal transmitted on the connection signal line SL is output to the control end of the $n^{th}$ connection switch 12*n* by using the second output subunit 14*a* of the $n^{th}$ connection control unit 14*n*, to control the $n^{th}$ connection switch 12*n* to be turned on, so that the $n^{th}$ first signal line DLn is electrically connected to one repair line DUM. In addition, the reset control signal input end RET of the $(n-1)^{th}$-stage first shift unit 11(*n*−1) receives the enable signal output by the shift output end OUT of the $n^{th}$-stage first shift unit 11*n*, and then a reset signal transmitted by the first reset signal line OFF1 controls the $(n-1)^{th}$-stage first shift unit 11(*n*−1) to be turned off and the shift output end OUT of the $(n-1)^{th}$-stage first shift unit 11(*n*−1) is reset.

Then, as shown in FIG. 6, the shift output ends OUT of the $(n+1)^{th}$-stage first shift unit 11(*n*+1) to the $m^{th}$-stage first shift unit 11*m* may sequentially output enable signals, but because the selector switch 13 is not turned on, these enable signals do not affect the $(n+1)^{th}$ first signal line DL(n+1) to the $m^{th}$ first signal line DLm. In addition, after the shift output end OUT of the $n^{th}$-stage first shift unit 11*n* outputs the enable signal, the shift output ends OUT of the $(n+1)^{th}$-stage first shift unit 11(*n*+1) to the $m^{th}$ first shift unit 11*m* may not output an enable signal again.

As shown in FIG. 6, the first reset signal line OFF1 and the second reset signal line OFF2 may alternatively always transmit a reset signal, such as a low-level signal.

In an embodiment of this application, control ends of a plurality of selector switches 13 in the selector switch group are electrically connected to the same selection signal line SEL, thereby reducing a quantity of signal lines. Then, when the first shift unit 11 corresponding to one disconnected first signal line DL outputs an enable signal, the connection signal line SEL transmits a selection signal, so that all the selector switches 13 in one selector switch group are turned on. However, because other first shift units 11 do not output an enable signal, other first signal lines DL are not affected.

It should be noted that, in the signal line repair module 10 in this embodiment of this application, due to the existence of the connection control unit 14, when the connection control unit 14 receives an enable signal output by the corresponding first shift unit 11, the enable signal enables the second output subunit 14*a* of the connection control unit 14 to be continuously turned on and output a turn-on signal to the control end of the connection switch 12. Then the signal line repair module 10 in this embodiment of this application may repair a plurality of first signal lines DL.

Figure 7:
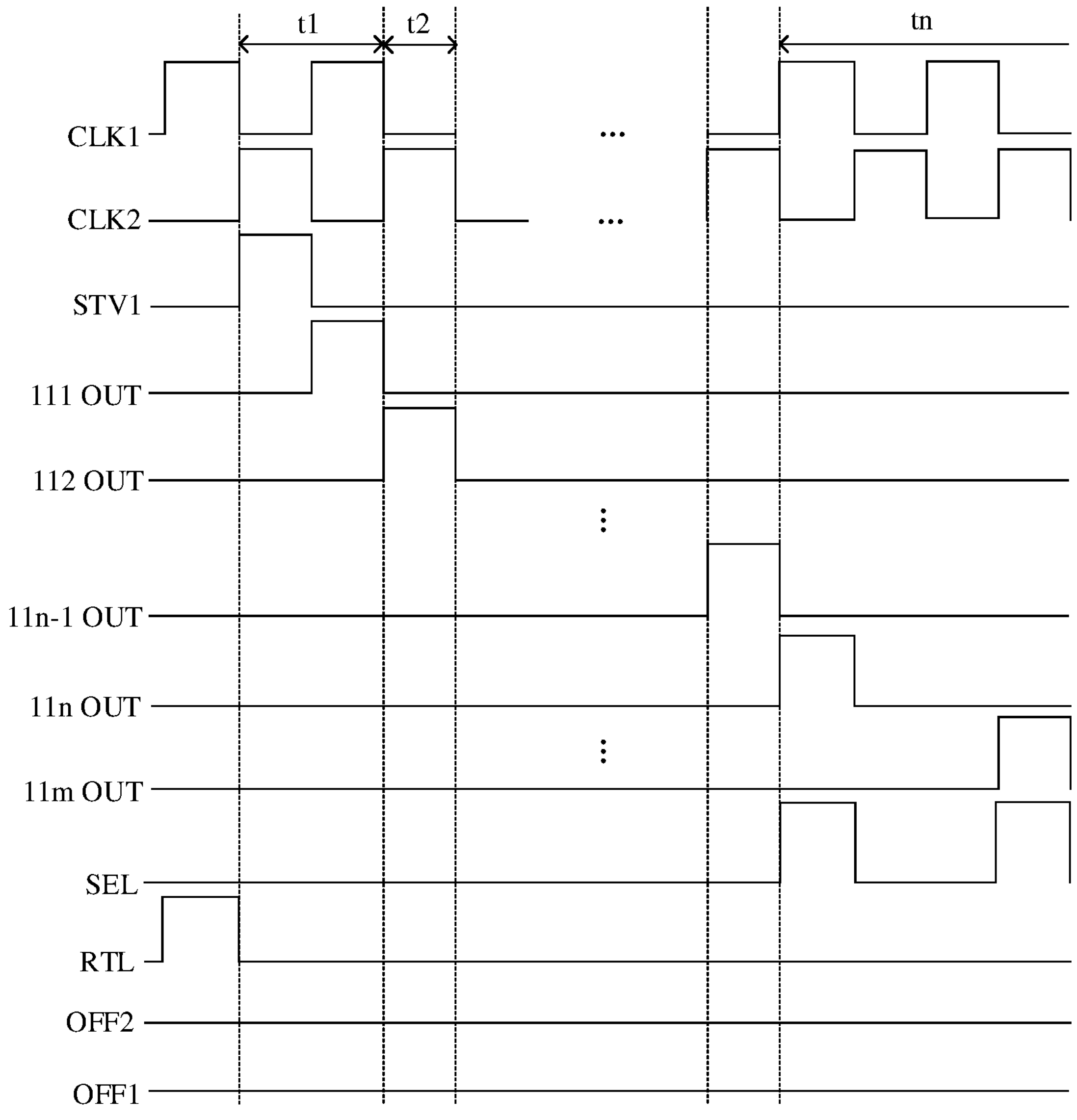
FIG. 7 is another sequence diagram of a signal line repair stage of the display apparatus shown in FIG. 3.

FIG. 7 is another sequence diagram of a signal line repair stage of the display apparatus shown in FIG. 3. Repair of a plurality of disconnected first signal lines DL in an embodiment of this application is described as an example below with reference to FIG. 7 and FIG. 3. That two disconnected first signal lines DL exist and the two disconnected first signal lines DL are repaired is used as an example for description, and it is assumed that both an $n^{th}$ first signal line DLn and an $m^{th}$ first signal line DLm are disconnected.

The $n^{th}$ first signal line DLn is repaired first. When the $n^{th}$-stage first shift unit 11*n* outputs an active signal, the selection signal line SEL transmits a selection signal, that is, a high-level signal, all the selector switches 13 are turned on, then the control end of the second output subunit 14*a* of the corresponding $n^{th}$ connection control unit 14*n* is electrically connected to the shift output end OUT of the $n^{th}$-stage first shift unit 11*n*, the $n^{th}$ connection switch 12*n* is turned on, and then the $n^{th}$ first signal line DLn is electrically connected to the repair line DUM.

Then, the selection signal line SEL transmits a turn-off signal to turn off all the selector switches 13. However, due to the existence of the second capacitor C2 in the connection control unit 14, potential of the second polar plate of the second capacitor C2 of the $n^{th}$ connection control unit 14*n* does not change, and then the $n^{th}$ connection switch 12*n* corresponding to the $n^{th}$ first signal line DLn is still turned on and keeps repairing the $n^{th}$ first signal line DLn.

Then, other first shift units 11 after the $n^{th}$-stage first shift unit 11*n* still sequentially output enable signals.

When the $m^{th}$-stage first shift unit 11*m* outputs an enable signal, the selection signal line SEL transmits a selection signal, that is, a high-level signal, then all the selector switches 13 are turned on, then the control end of the second output subunit 14*a* of the corresponding $m^{th}$ connection control unit 14*m* is electrically connected to the shift output end OUT of the $m^{th}$-stage first shift unit 11*m*, the $m^{th}$ connection switch 12*m* is turned on, and then the $m^{th}$ first signal line DLm is electrically connected to and kept electrically connected to the repair line DUM.

When another disconnected first signal line DL further needs to be repaired, and the first shift unit 11 corresponding to the disconnected first signal line DL outputs an enable signal, the enable signal transmitted on the selection signal line SEL controls the selector switch 13 to be turned on, and then the corresponding selection control unit 14 and the corresponding connection switch 12 implement repair of the another disconnected first signal lines DL.

It should be noted that, as shown in FIG. 6 and FIG. 7, before the time t1 when the first signal line DL is repaired, when the reset control line RTL may transmit an active signal, that is, a high-level signal, the seventh transistor T7 and the eighth transistor T8 in the second reset subunit 14*b* are turned on, and reset signals transmitted on each second reset signal line OFF2 may be transmitted to the control end of the connection switch 12 and the first polar plate of the second capacitor C2, so that the connection switch 12 is turned off, that is, the sixth transistor T6 is turned off, that is, action of electrically disconnecting all the first signal lines DL from the repair line DUM is completed.

Figure 8:
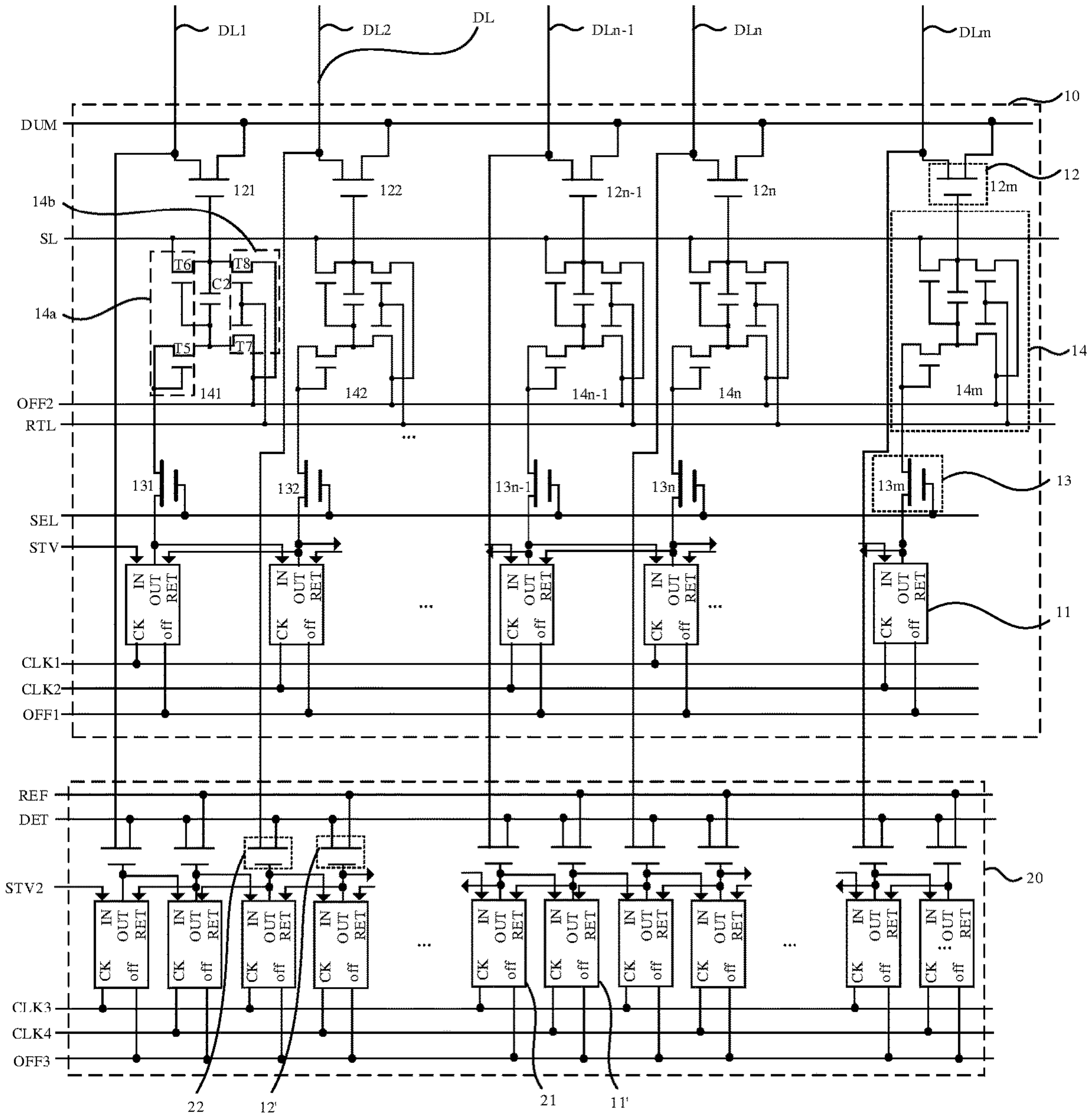
FIG. 8 is a partial enlarged view of another display apparatus according to an embodiment of this application.

FIG. 8 is a partial enlarged view of another display apparatus according to an embodiment of this application. As shown in FIG. 8, a non-display area BB of a display panel is further provided with a signal line defect detection module 20, and the signal line defect detection module 20 is electrically connected to a first signal line DL and configured to detect a defect of the first signal line DL.

The signal line defect detection module 20 includes a detection line DET, a reset line REF, a plurality of detection switches 22, a plurality of reset switches 12', a plurality of second shift units 21, and a plurality of reset shift units 11'.

The detection line DET is used to receive signals on first signal lines DL and transmit the signals to a drive chip 30. The drive chip 30 determines whether the signal on a first signal line DL is consistent with a reference signal. If a result is that the signals are inconsistent, it is determined that the first signal line DL is defective. If no signal exists on a first signal line DL, it is determined that the first signal line DL is disconnected.

The reset line REF is used to obtain a reset signal from the drive chip 30 and transmit the reset signal to the detection line DET to reset the signal on the detection line DET.

A plurality of detection switches 22 are disposed in a one-to-one correspondence with a plurality of first signal lines DL, an input end of each detection switch 22 is electrically connected to one first signal line DL, and an output end thereof is electrically connected to the detection line DET. When the detection switch 22 is turned on, the signal on the first signal line DL electrically connected to the input end of the detection switch may be transmitted to the detection line DET electrically connected to the output end of the detection switch, then the signal on the first signal line DL may be transmitted to a drive chip 3030 or a mainboard 003 by using the detection line DET, and the signal is processed to determine whether the first signal line DL is defective.

An input end of each reset switch 12' is electrically connected to the reset line REF, and an output end thereof is electrically connected to the detection line DET. When the reset switch 12' is turned on, a reset signal transmitted on the reset line REF electrically connected to the input end of the reset switch is transmitted to the detection line DET, and the signal on the detection line DET is reset.

The detection switches 22 are disposed in a one-to-one correspondence with the second shift units 21, shift output ends OUT of the second shift units 21 are electrically connected to control ends of the detection switches 22, the reset switches 12' are disposed in a one-to-one correspondence with the reset shift units if, and shift output ends OUT of the reset shift units 11' are electrically connected to control ends of the reset switches 12'. In addition, the signal output by the shift output end OUT of each second shift unit 21 and the shift output end OUT of each reset shift unit 11' are respectively used to control the detection switch **22*a* and the reset switch 12' electrically connected to the shift output ends OUT to be turned on or turned off. The detection switch 22 may be a transistor, a source of the detection switch 22** is a source of the transistor, a drain thereof is a drain of the transistor, and a gate thereof is a control end of the transistor.

Because after one detection switch 22 is turned on, a signal on the detection line DET is a signal on a first signal line DL electrically connected to the detection switch 22, to ensure detection accuracy of the next first signal line DL, the signal on the detection line DET needs to be reset. Therefore, the reset switches 12' may be alternately disposed in a one-to-one correspondence with the detection switches 22, and the reset switches 11' are turned on after the corresponding detection switches 22 are turned on and then turned off.

In this embodiment, the second shift unit 21 may have the same structure and operating principle as the first shift unit 11.

As shown in FIG. 8, reset signal input ends off of the second shift units 21 included in the signal line defect detection module 200 may be all electrically connected to a same reset signal line, and the reset signal line may continuously transmit reset signals in a signal line repair stage. For example, the reset signal input ends are electrically connected to a third reset signal line OFF3, and the third reset signal line OFF3 continuously outputs reset signals in the repair stage of the second shift unit 21.

To detect the first signal lines DL sequentially, signals on the first signal lines DL should be sequentially transmitted to the drive chip 3030 or a mainboard 004 by using the detection line DET, and then the second shift units 21 should be sequentially turned on, so that the corresponding detection switches 22 are sequentially turned on. Correspondingly, the reset shift units 11' should also be sequentially turned on, so that the corresponding reset switches 12' are sequentially turned on.

In an embodiment of this application, the second shift units 21 and the reset shift units 11' are sequentially alternately disposed and cascaded. The first shift units 11 are cascaded in the same manner. A turn-on signal input end IN of a first-stage second shift unit 21 is electrically connected to a start signal line, for example, a second start signal line STV2, and the second start signal line STV2 provides an enable signal to the turn-on signal input end IN of the first-stage second shift unit 21. Clock signal input ends CLK of adjacent second shift units 21 and reset shift units 11' among the cascaded second shift units 21 and reset shift units 11' are connected to different clock signal lines. As shown in FIG. 8, clock signal input ends CLK of the second shift units 21 and the reset shift units 11' are alternately electrically connected to a third clock signal line CLK3 and a fourth clock signal line CLK4, and the third clock signal line CLK3 and the fourth clock signal line CLK4 output pulse signals alternately, so that the cascaded second shift units 21 and reset shift units 11' may sequentially output enable signals in cooperation with a signal received by the turn-on signal input end IN. Then, after one second shift unit 21 outputs an enable signal, detection of one first signal line DL is completed; then the second shift unit 21 is turned off and the reset shift unit 11' cascaded with and adjacent to the second shift unit 21 outputs an enable signal to complete resetting of the detection line DET, and the second shift unit 21 of the previous stage is turned off; the second shift unit 21 of the next stage outputs an enable signal to complete detection of another first signal line DL; . . . ; and this operation is repeated until detection of all the first signal lines DL is completed.

In another embodiment of this application, the second shift units 21 are sequentially cascaded and the reset shift units 11' are sequentially cascaded. Then, after one second shift unit 21 outputs an enable signal, detection of one first signal line DL is completed; then the second shift unit 21 of this stage is turned off and the reset shift unit 11' outputs an enable signal to complete resetting of the detection line DET; then the second shift unit 21 cascaded with and adjacent to the previous second shift unit 21 outputs an enable signal to complete detection of one first signal line DL; . . . ; and this operation is repeated until detection of all the first signal lines DL is completed.

In this embodiment of this application, defect detection of the first signal lines DL does not require detection software or a detection device such as a microscope, which can reduce detection costs and improve detection efficiency.

An operating stage of a display apparatus further includes a signal line defect detection stage. In the signal line defect detection stage, the signal line defect detection module 20 operates and locates a defective first signal line DL. When a first signal line DL with a disconnection defect is detected, the signal line repair module 10 may be started. The operation process in which the signal line repair module 10 repairs a first signal line DL is the same as that of any of the foregoing embodiments, and repair of the disconnected first signal line DL is completed.

Figure 9:
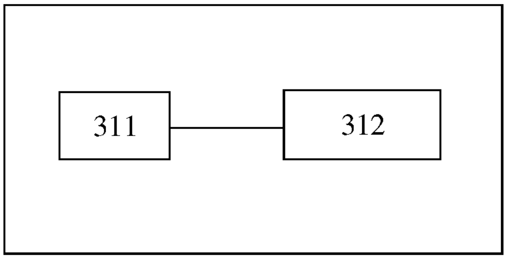
FIG. 9 is a schematic diagram of a structure of a drive chip according to an embodiment of this application.

An embodiment of this application further provide a drive chip, which can be configured to control signal line repair of a display panel according to an embodiment of this application. FIG. 9 is a schematic diagram of a structure of a drive chip according to an embodiment of this application. As shown in FIG. 9, the drive chip includes a control unit 311 and an input/output unit 312.

When the drive chip determines that a disconnected first signal line exists, the control unit 311 instructs the input/output unit 312 to provide a control signal to the signal line repair module 10, so that the disconnected first signal line is electrically connected to a repair line in the signal line repair module.

Specifically, a signal is output to a plurality of stages of cascaded first shift units 11, so that shift output ends of the plurality of stages of first shift units 11 sequentially output enable signals. For example, a signal is provided to a start signal line, a reset signal is provided to a reset signal line, pulse signals are provided to a clock signal line, and active signals or inactive signals are continuously output after a plurality of pulse signals are output to the clock signal line.

The control unit 311 is also configured to: when a first shift unit 11 corresponding to a disconnected first signal line DL outputs an enable signal, control the input/output unit 312 to output a selection signal to the selection signal line SEL, to control the corresponding selector switch to be turned on, then after the enable signal output by the first shift unit 11 corresponding to the disconnected first signal line DL reaches a corresponding connection control unit 14 by using a selector switch 13 turned on, the corresponding connection control unit 14 is controlled to output a turn-on signal, and the connection control unit 12 keeps outputting the turn-on signal to the control end of the connection switch 12, so that the selector switch 13 corresponding to the disconnected first signal line DL is turned on.

The drive chip is also configured to output a signal for controlling the sub-pixels to perform light-emitting display.

Referring to the foregoing illustration of FIG. 1 or FIG. 2, the drive chip in FIG. 1 or FIG. 2 is the drive chip 30 according to this embodiment of FIG. 9 of this application.

Figure 10:
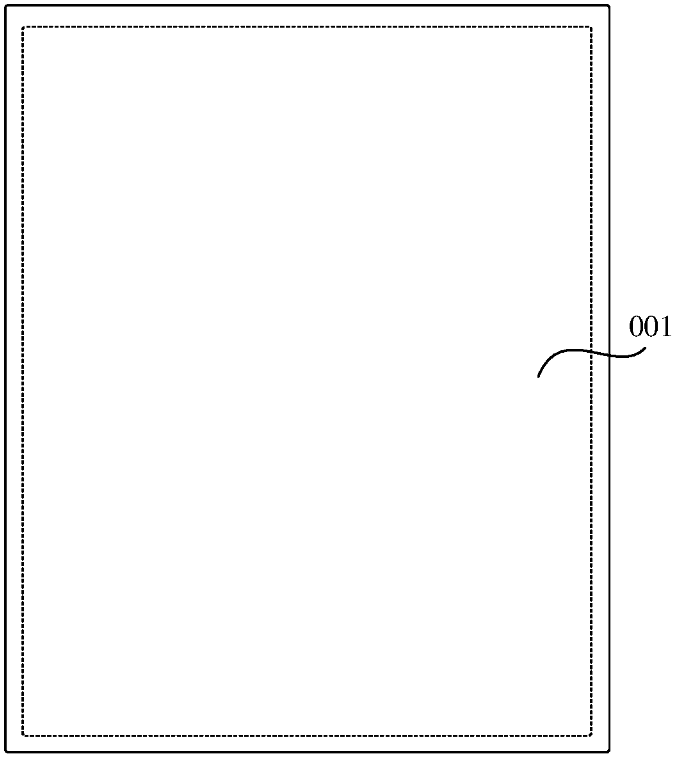
FIG. 10 is a schematic diagram of an electronic device according to an embodiment of this application.

This application further provides an electronic device. FIG. 10 is a schematic diagram of an electronic device according to an embodiment of this application. As shown in FIG. 10, the electronic device includes the display apparatus according to any one of the embodiments of this application. The specific structure of the display apparatus has been described in detail in the foregoing embodiments. Details are not described herein again. Certainly, the electronic device shown in FIG. 10 is provided only for schematic illustration, and may be, for example, any electronic device with a display function, such as a mobile phone, a tablet computer, a notebook computer, an E-book reader, a TV, or a smartwatch.

The foregoing descriptions are merely specific implementations of this application. Any person skilled in the art can easily conceive modifications or replacements within the technical scope of this application, and these modifications or replacements shall fall within the protection scope of this application. The protection scope of this application shall be subject to the protection scope of the claims.

What is claimed is:

1. A display apparatus, comprising:

a plurality of sub-pixels, wherein the sub-pixels are configured to be used for light-emitting display;

a plurality of signal lines, wherein the plurality of signal lines are electrically connected to the plurality of sub-pixels and are configured to provide a signal required for light-emitting display to the plurality of sub-pixels;

a signal line repair circuit, wherein the signal line repair circuit is electrically connected to the plurality of signal lines, and configured to repair a disconnected signal line; and the signal line repair circuit comprises:

a repair line;

a connection switch group, wherein the connection switch group comprises a plurality of connection switches, and the plurality of connection switches are disposed in a one-to-one correspondence with the plurality of signal lines, input ends of the plurality of connection switches are electrically connected to the corresponding signal lines, and output ends of the plurality of connection switches are electrically connected to the repair line;

a connection control circuit group, wherein the connection control circuit group comprises a plurality of connection control circuits, the plurality of connection control circuits are disposed in a one-to-one correspondence with the plurality of connection switches, and an output end of each connection control circuit is connected to a control end of a corresponding connection switch, and when the output end of each connection control circuit outputs a turn-on signal to the control end of the corresponding connection switch, the signal line electrically connected to the input end of the corresponding connection switch is electrically connected to the repair line that is electrically connected to the output end of the corresponding connection switch;

a selector switch group, wherein the selector switch group comprises a plurality of selector switches, the plurality of selector switches are disposed in a one-to-one correspondence with the plurality of connection control circuits, and an output end of each selector switch is electrically connected to a connection control end of a corresponding connection control circuit; and a first shift circuit group, wherein the first shift circuit group comprises a plurality of stages of first shift circuits, the plurality of stages of first shift circuits are disposed in a one-to-one correspondence with the plurality of selector switches, and a shift output end of each first shift circuit is electrically connected to an input end of a corresponding selector switch; and a drive chip, wherein the drive chip is electrically connected to the plurality of signal lines and the signal line repair circuit, and is configured for providing the signal required for controlling the light-emitting display of the plurality of sub-pixels to the signal lines, and sending, when determining that a disconnected signal line exists, a control signal to the signal line repair circuit, to enable the disconnected signal line to be electrically connected to the repair line in the signal line repair circuit, and wherein:

sending the control signal to the signal line repair circuit, to enable the disconnected signal line to be electrically connected to the repair line in the signal line repair circuit, comprises:

sending the control signal to the signal line repair circuit, so that a shift output end of the first shift circuit corresponding to the disconnected signal line outputs an enable signal, to control a corresponding selector switch to be turned on; and after the enable signal output by the shift output end reaches a corresponding connection control circuit by using the selector switch that is turned on, controlling the corresponding connection control circuit to keep outputting a turn-on signal, and transmitting the turn-on signal to a control end of a corresponding connection switch to turn on the corresponding connection switch, so that the disconnected signal line is electrically connected to the repair line.

2. The display apparatus according to claim 1, wherein the plurality of stages of first shift circuits in the first shift circuit group are sequentially cascaded.

3. The display apparatus according to claim 1, wherein:

each connection control circuit comprises a second output subcircuit, a control end of each second output subcircuit is the connection control end and is electrically connected to an output end of a corresponding selector switch, an input end of each second output subcircuit is electrically connected to a turn-on signal line, and an output end of each second output subcircuit is used as the output end of the corresponding connection control circuit and is electrically connected to a control end of a corresponding connection switch;

sending the control signal to the signal line repair circuit by the drive chip comprises transmitting a turn-on signal to the turn-on signal line; and each second output subcircuit is configured to: when receiving the enable signal output by the shift output end of the corresponding first shift circuit, transmit the turn-on signal transmitted on the turn-on signal line to the control end of the corresponding connection switch, to control the corresponding connection switch to be turned on.

4. The display apparatus according to claim 3, wherein:

each second output subcircuit comprises a fifth transistor, a sixth transistor, and a second capacitor;

a gate of each fifth transistor is electrically connected to a source thereof and is electrically connected to the output end of the corresponding selector switch as the connection control end, and a drain thereof is electrically connected to a first polar plate of the corresponding second capacitor;

a gate of each sixth transistor is electrically connected to the first polar plate of the corresponding second capacitor, a source of each sixth transistor is electrically connected to the turn-on signal line as the input end of the corresponding second output subcircuit, and a drain of each sixth transistor is electrically connected to a second polar plate of the corresponding second capacitor as the output end of corresponding second output subcircuit; and the second polar plate of each second capacitor is electrically connected to the control end of the corresponding connection switch as the output end of the corresponding connection control circuit.

5. The display apparatus according to claim 4, wherein:

each connection control circuit further comprises a second reset subcircuit, a control end of each second reset subcircuit is used as the reset control end of the corresponding connection control circuit and is electrically connected to a reset control line, an input end of each second reset subcircuit is electrically connected to a second reset signal line, and an output end of each second reset subcircuit is electrically connected to a control end of a corresponding connection switch as the output end of the corresponding connection control circuit;

sending the control signal to the signal line repair circuit by the drive chip comprises transmitting a reset control signal to the reset control line and transmitting a reset signal to the second reset signal line; and each second reset subcircuit is configured to: when the reset control line receives the reset control signal, transmit the reset signal transmitted on the second reset signal line to a control end of a corresponding connection switch, to control the signal line electrically connected to the input end of the corresponding connection switch to be electrically disconnected from the repair line electrically connected to the output end of the corresponding connection switch.

6. The display apparatus according to claim 5, wherein:

each second reset subcircuit comprises a seventh transistor and an eighth transistor; and a gate of each seventh transistor and a gate of each eighth transistor as reset control ends of the corresponding second reset subcircuit are electrically connected to the reset control line, a source of each seventh transistor and a source of each eighth transistor as input ends of the corresponding second reset subcircuit are electrically connected to the second reset signal line, a drain of each seventh transistor is electrically connected to the first polar plate of the corresponding second capacitor, and a drain of each eighth transistor is electrically connected to the control end of the corresponding connection switch.

7. The display apparatus according to claim 1, wherein the display apparatus further comprises a signal line defect detection circuit, the signal line defect detection circuit is electrically connected to the signal lines and configured to detect a defect of the signal lines, and the signal line defect detection circuit comprises:

a detection line, configured to transmit signals on the signal lines to the drive chip;

a plurality of detection switches, wherein the plurality of detection switches are disposed in a one-to-one correspondence with a plurality of signal lines, an input end of each detection switch is electrically connected to a corresponding signal line, and an output end of each detection switch is electrically connected to the detection line; and when a detection switch of the plurality of detection switches is turned on, a signal on the signal line electrically connected to the input end of the detection switch is transmitted to the detection line electrically connected to the output end of the detection switch;

a reset line, configured to obtain a reset signal from the drive chip and transmit the reset signal to the detection line; and reset switches, wherein an input end of each reset switch is electrically connected to the repair line, and an output end of each reset switch is electrically connected to the detection line; and when each reset switch is turned on, a reset signal transmitted on the reset line electrically connected to the input end of the respective reset switch is transmitted to the detection line.

8. The display apparatus according to claim 7, wherein the signal line defect detection circuit comprises a plurality of reset switches, the plurality of detection switches and the reset switches are alternately disposed in a one-to-one correspondence, and the reset switches are turned on after the corresponding detection switches are turned on and then turned off.

9. The display apparatus according to claim 8, wherein the signal line defect detection circuit further comprises:

a plurality of second shift circuits, wherein the plurality of second shift circuits are electrically connected to the plurality of detection switches in a one-to-one correspondence, and signals output by shift output ends of the plurality of second shift circuits control the plurality of detection switches electrically connected thereto to be turned on or turned off; and a plurality of reset shift circuits, wherein the plurality of reset shift circuits are electrically connected to the reset switches in a one-to-one correspondence, and signals output by shift output ends of the plurality of reset shift circuits control the reset switches electrically connected thereto to be turned on or turned off.

10. A drive chip, comprising:

a control circuit, configured to: provide a signal to control sub-pixels to perform light-emitting display; and an input/output circuit, configured to: send a control signal to a signal line repair circuit, wherein sending the control signal to the signal line repair circuit causes a shift output end of a first shift circuit of the signal line repair circuit corresponding to a disconnected signal line to output an enable signal, to control a corresponding selector switch of the signal line repair circuit to be turned on, and wherein after the enable signal output by the shift output end reaches a corresponding connection control circuit of the signal line repair circuit by using the selector switch that is turned on, the corresponding connection control circuit is controlled to keep outputting a turn-on signal, and the turn-on signal is transmitted to a control end of a corresponding connection switch of the signal line repair circuit to turn on the corresponding connection switch, so that the disconnected signal line is electrically connected to the repair line.

11. An electronic device, comprising a display apparatus, the display apparatus comprising:

a plurality of sub-pixels, wherein the sub-pixels are configured to be used for light-emitting display;

a plurality of signal lines, wherein the plurality of signal lines are electrically connected to the plurality of sub-pixels and are configured to provide a signal required for light-emitting display to the plurality of sub-pixels;

a signal line repair circuit, wherein the signal line repair circuit is electrically connected to the plurality of signal lines, and configured to repair a disconnected signal line; and the signal line repair circuit comprises:

a repair line;

a connection switch group, wherein the connection switch group comprises a plurality of connection switches, and the plurality of connection switches are disposed in a one-to-one correspondence with the plurality of signal lines, input ends of the plurality of connection switches are electrically connected to the corresponding signal lines, and output ends of the plurality of connection switches are electrically connected to the repair line;

a connection control circuit group, wherein the connection control circuit group comprises a plurality of connection control circuits, the plurality of connection control circuits are disposed in a one-to-one correspondence with the plurality of connection switches, and an output end of each connection control circuit is connected to a control end of a corresponding connection switch, and when the output end of the respective connection control circuit outputs a turn-on signal to the control end of the corresponding connection switch, the signal line electrically connected to the input end of the corresponding connection switch is electrically connected to the repair line electrically connected to the output end of the corresponding selector switch;

a selector switch group, wherein the selector switch group comprises a plurality of selector switches, the plurality of selector switches are disposed in a one-to-one correspondence with the plurality of connection control circuits, and an output end of each selector switch is electrically connected to a connection control end of a corresponding connection control circuit; and a first shift circuit group, wherein the first shift circuit group comprises a plurality of stages of first shift circuits, the plurality of stages of first shift circuits are disposed in a one-to-one correspondence with the plurality of selector switches, and a shift output end of each first shift circuit is electrically connected to an input end of a corresponding selector switch; and a drive chip, wherein the drive chip is electrically connected to the plurality of signal lines and the signal line repair circuit, and is configured for providing the signal required for controlling the light-emitting display of the plurality of sub-pixels to the signal lines, and sending, when determining that a disconnected signal line exists, a control signal to the signal line repair circuit to enable the disconnected signal line to be electrically connected to the repair line in the signal line repair circuit, and wherein:

sending the control signal to the signal line repair circuit, to enable the disconnected signal line to be electrically connected to the repair line in the signal line repair circuit comprises:

sending the control signal to the signal line repair circuit, so that a shift output end of the first shift circuit corresponding to the disconnected signal line outputs an enable signal, to control a corresponding selector switch to be turned on; and after the enable signal output by the shift output end reaches a corresponding connection control circuit by using the selector switch turned on, controlling the corresponding connection control circuit to keep outputting a turn-on signal, and transmitting the turn-on signal to a control end of a corresponding connection switch to turn on the corresponding connection switch, so that the disconnected signal line is electrically connected to the repair line.

12. The electronic device according to claim 11, wherein the plurality of stages of first shift circuits in the first shift circuit group are sequentially cascaded.

13. The electronic device according to claim 11, wherein:

each connection control circuit comprises a second output subcircuit, a control end of each second output subcircuit is the connection control end and is electrically connected to an output end of a corresponding selector switch, an input end of each second output subcircuit is electrically connected to a turn-on signal line, and an output end of each second output subcircuit is used as the output end of the corresponding connection control circuit and is electrically connected to a control end of a corresponding connection switch;

sending the control signal to the signal line repair circuit by the drive chip comprises transmitting a turn-on signal to the turn-on signal line; and each second output subcircuit is configured to: when receiving the enable signal output by the shift output end of the corresponding first shift circuit, transmit the turn-on signal transmitted on the turn-on signal line to the control end of the corresponding connection switch, to control the corresponding connection switch to be turned on.

14. The electronic device according to claim 13, wherein:

each second output subcircuit comprises a fifth transistor, a sixth transistor, and a second capacitor;

a gate of each fifth transistor is electrically connected to a source thereof and is electrically connected to the output end of the corresponding selector switch as the connection control end, and a drain thereof is electrically connected to a first polar plate of the corresponding second capacitor;

a gate of each sixth transistor is electrically connected to the first polar plate of the corresponding second capacitor, a source of each sixth transistor is electrically connected to the turn-on signal line as the input end of the corresponding second output subcircuit, and a drain of each sixth transistor is electrically connected to a second polar plate of the corresponding second capacitor as the output end of corresponding second output subcircuit; and the second polar plate of each second capacitor is electrically connected to the control end of the corresponding connection switch as the output end of the corresponding connection control circuit.

15. The electronic device according to claim 14, wherein:

each connection control circuit further comprises a second reset subcircuit, a control end of each second reset subcircuit is used as the reset control end of the corresponding connection control circuit and is electrically connected to a reset control line, an input end of each second reset subcircuit is electrically connected to a second reset signal line, and an output end of each second reset subcircuit is electrically connected to a control end of a corresponding connection switch as the output end of the corresponding connection control circuit;

sending the control signal to the signal line repair circuit by the drive chip comprises transmitting a reset control signal to the reset control line and transmitting a reset signal to the second reset signal line; and each second reset subcircuit is configured to: when the reset control line receives the reset control signal, transmit the reset signal transmitted on the second reset signal line to a control end of a corresponding connection switch, to control the signal line electrically connected to the input end of the corresponding connection switch to be electrically disconnected from the repair line electrically connected to the output end of the corresponding connection switch.

16. The electronic device according to claim 15, wherein:

each second reset subcircuit comprises a seventh transistor and an eighth transistor; and a gate of each seventh transistor and a gate of each eighth transistor as reset control ends of the corresponding second reset subcircuit are electrically connected to the reset control line, a source of each seventh transistor and a source of each eighth transistor as input ends of the corresponding second reset subcircuit are electrically connected to the second reset signal line, a drain of each seventh transistor is electrically connected to the first polar plate of the corresponding second capacitor, and a drain of each eighth transistor is electrically connected to the control end of the corresponding connection switch.

17. The electronic device according to claim 11, wherein:

the display apparatus further comprises a signal line defect detection circuit, the signal line defect detection circuit is electrically connected to the signal lines and configured to detect a defect of the signal lines, and the signal line defect detection circuit comprises:

a detection line, configured to transmit signals on the signal lines to the drive chip;

a plurality of detection switches, wherein the plurality of detection switches are disposed in a one-to-one correspondence with a plurality of signal lines, an input end of each detection switch is electrically connected to a corresponding signal line, and an output end of each detection switch is electrically connected to the detection line; and when a detection switch of the plurality of detection switches is turned on, a signal on the signal line electrically connected to the input end of the detection switch is transmitted to the detection line electrically connected to the output end of the detection switch;

a reset line, configured to obtain a reset signal from the drive chip and transmit the reset signal to the detection line; and reset switches, wherein an input end of each reset switch is electrically connected to the repair line, and an output end of each reset switch is electrically connected to the detection line; and when each reset switch is turned on, a reset signal transmitted on the reset line electrically connected to the input end of the respective reset switch is transmitted to the detection line.

18. The electronic device according to claim 17, wherein the signal line defect detection circuit comprises a plurality of reset switches, the plurality of detection switches and the reset switches are alternately disposed in a one-to-one correspondence, and the reset switches are turned on after the corresponding detection switches are turned on and then turned off.

19. The electronic device according to claim 17, wherein the signal line defect detection circuit further comprises:

a plurality of second shift circuits, wherein the plurality of second shift circuits are electrically connected to the plurality of detection switches in a one-to-one correspondence, and signals output by shift output ends of the plurality of second shift circuits control the plurality of detection switches electrically connected thereto to be turned on or turned off; and a plurality of reset shift circuits, wherein the plurality of reset shift circuits are electrically connected to the reset switches in a one-to-one correspondence, and signals output by shift output ends of the plurality of reset shift circuits control the reset switches electrically connected thereto to be turned on or turned off.

* * * * *